Figure 1:
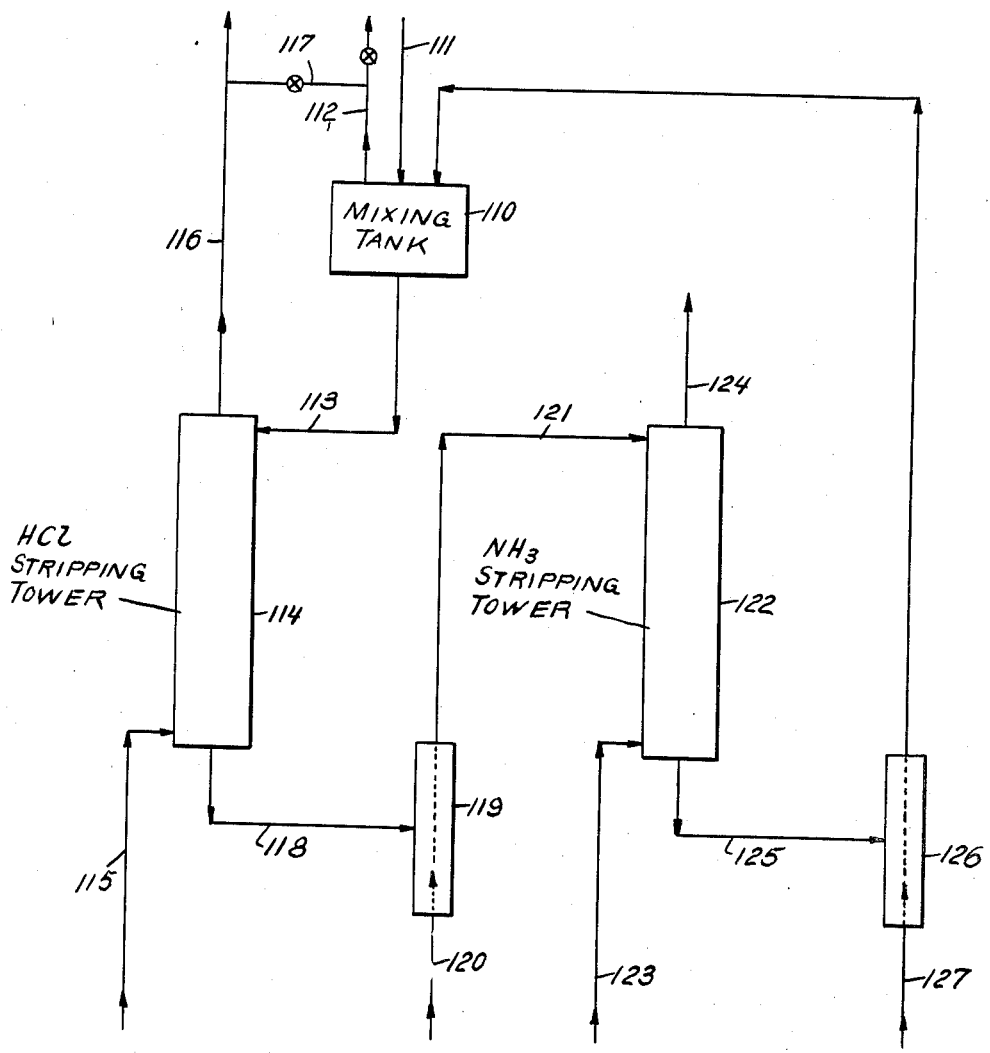

Feb. 21, 1956

C. F. PRUTTON ET AL 2,735,749

THE SEPARATE RECOVERY OF AMMONIA AND HYDROGEN
CHLORIDE FROM AMMONIUM CHLORIDE

Filed Aug. 16, 1951

2 Sheets-Sheet 1

INVENTORS
CARL F. PRUTTON
WARREN STANDISH MILLER
LOUIS C. HIRDLER
BY
Adams, Forward and McLean
ATTORNEYS Feb. 21, 1956

C. F. PRUTTON ET AL 2,735,749
THE SEPARATE RECOVERY OF AMMONIA AND HYDROGEN
CHLORIDE FROM AMMONIUM CHLORIDE

Filed Aug. 16, 1951

2 Sheets-Sheet 2

Fig. 2.

INVENTORS
CARL F. PRUTTON
WARREN STANDISH MILLER
LOUIS C. HIRDLER
BY
Adams, Forward and McLean
ATTORNEYS

United States Patent Office 2,735,749
Patented Feb. 21, 1956

2,735,749

THE SEPARATE RECOVERY OF AMMONIA AND HYDROGEN CHLORIDE FROM AMMONIUM CHLORIDE

Carl F. Prutton, Baltimore, Md., Warren Standish Miller, Houston, Tex., and Louis C. Hirdler, Maplewood, La., assignors to Olin Mathieson Chemical Corporation, a corporation of Virginia Application August 16, 1951, Serial No. 242,151

7 Claims. (Cl. 23—154)

This invention relates to the separation of ammonia and hydrogen chloride from ammonium chloride by circulating a melt of an acid sulfate containing ammonium chloride through successive hydrogen chloride and ammonia stripping stages in a cyclic process which is characterized by the use of an organic medium to supply process heat. In a more particular aspect, the invention provides a continuous cyclic processing system in which the organic medium also acts as a stripping aid in the stripping stages and as a transport agent for the circulating melt. The invention also includes in a special aspect, a method of ammonium chloride feed preparation and injection into the cyclic operating system.

Ammonium chloride is a material of relatively low economic value which is produced in large quantities as a by-product in the ammonia-soda process for soda ash manufacture. At present, the ammonium chloride is not recovered from the ammonia-soda liquor but is converted by lime addition to calcium chloride in order to recover the ammonia at the cost of the chlorine loss. Theoretically, ammonium chloride should be readily dissociated into ammonia and hydrogen chloride, which are products of commercial value and demand. Ammonium chloride however is one of the most corrosive substances known and the problems of heating and handling it in any dissociation process have proved too difficult to invite commercial effort.

For example, the proposal has been made to use an acid sulfate such as sodium or ammonium bisulfate as a reagent for separating ammonia and hydrogen chloride. When a mixture of ammonium chloride and sodium bisulfate is heated, for example, to temperatures upwards of 200° C., hydrogen chloride is evolved and sodium ammonium sulfate is formed. Minor amounts of ammonium chloride are also vaporized. As the ammonium chloride supply is depleted, the evolution of hydrogen chloride slackens and at more elevated temperatures, upwards of 300° C., ammonia, accompanied by minor amounts of ammonium chloride, is evolved. The residue is largely sodium bisulfate.

The reaction has not aroused commercial interest because it requires the input of considerable quantities of heat and because the salts involved are among the most corrosive materials known in commercial chemical processes. Of the metals only tantalum, gold and platinum are sufficiently resistant to the corrosive action of the molten salts or the vaporized ammonium chloride to stand up for more than very limited periods of commercial operation. Glass, graphite and ceramic materials of an acid resistant nature withstand the corrosive action of the materials involved but leave the serious problem of how to supply the necessary process heat. Heat transfer surfaces made of the corrosive resistant refractory materials would have to be of such large areas that the equipment and heating requirements would render the process wholly impractical.

In addition to the heat transfer problem created by the corrosive nature of the materials involved, the batch stripping of hydrogen chloride and ammonia from a hot mixture of molten bisulfate and ammonium chloride is unsatisfactory because neither product is obtained in a form free enough of the other or sublimed ammonium chloride at satisfactory yield levels for economical handling. In addition, heat requirements for satisfactory yields of ammonia based on the ammonium chloride charged and/or the requirements in terms of quantity of stripping medium or cost of vacuum operation become excessive for commercial operation.

We have devised a cyclic process which is commercially applicable because all of the heat required for the process is introduced by direct contact between the materials of reaction and a stable inert organic liquid which is separately heated in a conventional boiler or fired tube type heater. Our process is characterized by continuously circulating a hot melt of bisulfate to which ammonium chloride is added through separate stripping stages from which hydrogen chloride and ammonia are successively removed. The circulating melt permits a staged heating and stripping process which facilitates separation of hydrogen chloride and ammonia in satisfactory purity. The cyclic nature of the process permits high yields based on the ammonium chloride charged under particular conditions discovered for ammonium chloride concentration in the circulating melt, residual ammonium chloride for recycle and stripping temperatures. The process is generally described and claimed in our copending application Serial No. 242,152 filed August 16, 1951.

According to our invention a melt of an alkali metal or ammonium bisulfate containing about 0.15 to 0.75 mole of ammonium chloride per mole of bisulfate is circulated through a hydrogen chloride stripping zone and then through an ammonia stripping zone. Ammonium chloride is added to the melt to maintain the desired operating concentration. A temperature of about 220° to 270° C. is maintained in the hydrogen chloride stripping zone. A temperature of about 330° to 380° C. is maintained in the ammonia stripping zone. A vapor overhead stream and a stripped melt stream are separately removed from each stripping zone. The process heat is supplied by direct transfer from an inert thermally stable fluid organic medium to the circulating melt mixture.

All the process heat required may be introduced into the system in a boiler for the organic liquid and superheater for the organic vapors. All the required heat of reaction is transferred by direct contact of the organic liquid and its vapors to the reacting melt. No heat transfer surfaces for the introduction of heat are required except in the boiler and superheater. Some cooling is effected at appropriate points in the system but is required only for organic liquid carrying at the most minor amounts of suspended ammonium chloride.

It is particularly advantageous to supply the bulk of the process heat to the stripping zones by injecting the hot vaporized organic liquid directly into each stripping zone in sufficient quantities to obtain desired stripping temperatures and at the same time obtain the benefit of the vapors in stripping the hydrogen chloride or ammonia from the melt. Moreover, according to our invention, a portion of the hot vaporized organic liquid advantageously is employed to transport the circulating melt from one stage of the system to a succeeding stage in the system. Thus each stripping zone is advantageously arranged in the form of a stripping tower through which the circulating melt flows in countercurrent contact with the hot vaporized organic liquid. The stripper or partially stripped melt withdrawn from the foot of the stripping tower then is elevated to the top of a succeeding stripping tower, or to the initial mixing zone to recommence the cyclic operation, by flowing the circulating melt into a vapor lift pot into which the hot organic vapors are injected.

The organic medium employed according to our invention advantageously is a liquid of sufficiently high boiling point to facilitate its separation from the product vapors in the product recovery zones. The organic liquid must be stable in the vapor phase at temperatures permitting the introduction of sufficient heat into the system to effect the desired separating and stripping reaction without requiring unreasonable ratios of organic liquid to ammonium chloride. An organic liquid which is substantially stable at 500° C. or higher is satisfactory. The vapor also must be stable under the conditions of the stripping zone and must be chemically inert with respect to the reaction materials. We have found that many of the chlorinated aromatics are highly effective for the purposes of our invention. Suitable examples are chlorobenzene and orthodichlorobenzene, particularly a stabilized orthodichlorobenzene, such as Dowtherm E. Higher boiling chlorinated aromatics, such as mixed isomeric trichlorobenzenes or the Arochlors (chlorinated diphenyls) also are suitable since in general they are stable at temperatures of about 500° C. Although the requirements for the organic medium are rather exacting they are not necessarily related to chemical composition or structure and therefore a broad range of vaporizable heat stable organic liquids having the requisite chemical inertness within the reaction system are available. For example, benzene itself is useful since it has a high degree of thermal stability. However, it has the disadvantages of a low boiling point which makes its separation from the product gases more difficult than in the case of the higher boiling liquids and its flammability introduces a serious fire hazard.

Sodium bisulfate is preferred as the reacting acid sulfate because of its cheapness and availability. The other alkali metal bisulfates and ammonium bisulfate also are useful. A mixture of about 50 to 75 per cent of sodium bisulfate with ammonium bisulfate is particularly advantageous and is preferred since it has the lowest melting point and, when melted, the lowest viscosity of any of the acid sulfates or acid sulfate mixtures. Other mixed melts may be employed; e. g. potassium bisulfate or lithium bisulfate containing melts, or three component melt mixtures.

One of the particular problems in handling ammonium chloride in thermal processes has been the problem of charging it to the system. Thus when solid ammonium chloride is introduced into a hot melt of a bisulfate considerable proportions of the ammonium chloride promptly sublime so that losses are high. The corrosion problem is compounded, maintenance of continuous operation is made more difficult and product recovery is complicated. When solid ammonium chloride is vaporized by preheating and the vapors are passed into the melt, difficulties are encountered due to poor heat transfer into the solid ammonium chloride, its highly corrosive nature and the ever present danger of condensed ammonium chloride plugging the lines. Moreover, solid ammonium chloride ordinarily contains minor proportions of moisture. It is important to dehydrate the charge both from the standpoint of minimizing the corrosion problem and from the standpoint of product quality in order to preserve the anhydrous nature of the ammonia and hydrogen chloride products. Our invention provides a specially advantageous system of feed preparation and for charging the ammonium chloride to the reaction system. The ammonium chloride feed to the process is mixed with the hot organic liquid, which for the purpose must be water immiscible and is selected to have a boiling point above that of water but less than the sublimation point of ammonium chloride. The moisture of the feed is flashed off with entraining quantities of the organic liquid by simple distillation, and the dehydrated slurry is charged to the circulating melt in the reaction system. The flashed distillate is condensed, the water is removed in a separator, and the organic liquid is returned to the dehydration zone for reslurrying.

The operation of our invention will be further described by reference to Figure 1 of the accompanying drawings which represents schematically a simplified flow diagram of the essentials of the processing system proper. Ammonium chloride feed is mixed with a body of the circulating bisulfate melt in mixing tank 110 by addition through means indicated at line 111. As noted above, the ammonium chloride most advantageously has been premixed with hot organic liquid, in which event vapor vent line 112 is provided.

The melt containing admixed ammonium chloride flows by gravity through connection 113 to hydrogen chloride stripping tower 114. Heat to maintain the desired stripping temperature is supplied to the melt flowing down through the stripping tower 114 by means of preheated vaporized organic vapors introduced at the foot of the tower through connection 115. A vapor stream containing stripped hydrogen chloride is taken overhead through line 116. Valved connection 117 provides for common handling with the vapor and hydrogen chloride vented from mixing tank 110. The partially stripped melt flows from mixing connection 118 to vapor lift pot 119 by gravity through which it is elevated by direct injection of organic vapors or other inert gaseous means introduced through connection 120 into line 121 and thence to the top of ammonia stripping tower 122. A pump of course can be employed as the lifting means or the ammonia stripping tower 122 may be arranged below the hydrogen chloride stripping tower 114 so that flow into it is by gravity.

Heat to maintain the desired ammonia stripping temperature which is substantially above that maintained in the hydrogen chloride stripping tower 114 is supplied to melt flowing downwardly through the tower 122 by direct injection of hot organic vapors near the foot of the tower by means of connection 123. A vapor stream containing stripped ammonia is withdrawn overhead through line 124 and the stripped melt is flowed by gravity through line 125 to vapor lift pot 126. Direct injection of hot organic vapors or other inert gaseous lift medium by means of connection 127 elevates the melt through line 128 for return to the mixing tank 110.

In operation according to our invention, the proportion of ammonium chloride in the melt circulated through the stripping stages advantageously approximates about 0.15 to 0.50 mole of ammonium chloride per mole of bisulfate, and advantageously about 0.30–0.35:1 mole. If the proportion of ammonium chloride falls below 0.15, an uneconomical proportion of bisulfate recycle is required compared to the amount of product recovered. The proportion of ammonium chloride may range up to say 0.75 to 1, but above about 0.75 to 1 too much ammonium chloride comes off with the hydrogen chloride which complicates the recovery procedure and tends to increase ammonium chloride vaporization. For good yields based on the ammonium chloride charged we prefer to operate among the lower concentration ranges, say 0.3 to 0.35 mole of ammonium chloride per mole of bisulfate where severe stripping conditions can be employed without undue vaporization of ammonium chloride. The concentration of ammonium chloride in the charge slurry usually comprises about 20 to 25 per cent of ammonium chloride admixed with about 75 to 80 per cent of the organic liquid. Slurries of lower concentration, as low as about 5 per cent, may be used but excessive amounts of organic liquid must then be vaporized and condensed. Furthermore, solidification of the bisulfate is to be avoided and this may be more difficult with excessive proportions of organic liquid. The concentration of the slurry is limited by pumping and settling difficulties within the transfer system.

The bisulfate melt must be maintained at a temperature above 170° C., its melting point. It is desirable, however, to provide a margin of safety to prevent the melt from setting up anywhere in the system by maintaining the temperature at all points above 200° to 220° C. In the hydrogen chloride stripping zone a temperature within the range of about 220° to 270° C. should be maintained. The temperature should be maintained below about 300° C. in order to avoid the sublimation of considerable amounts of unreacted ammonium chloride. We prefer to operate at the highest temperatures consistent with low ammonium chloride vaporization in order to favor the hydrogen chloride evolution and minimize the quantities of stripping medium or the degree of vacuum required. We prefer to maintain temperatures of about 240° to 260° C. in the hydrogen chloride stripper.

The temperature in the ammonia stripping zone should be maintained at about 330° to 380° C. Again we prefer to operate at the highest temperature level consistent with good yields and prefer a temperature within the range of about 340° to 360° C. In the range of 360° to 400° C. a substantial vapor pressure of ammonium sulfate is developed. Under the operating conditions of our invention conversion per pass is limited to about 80 to 85 per cent so that as much as about 20 per cent residual ammonium chloride is continuously recycled. Thermal requirements and the quantity of stripping medium required are reduced accordingly, and product recovery procedure is simplified.

While the process is operated at substantially atmospheric pressure or only such pressures necessary to promote circulation of the fluids, somewhat reduced pressure may be advantageous in order to facilitate the removal of the product gases from the melt. For example, by reducing the pressure in the stripping sections to one-half atmosphere, the stripping temperatures may be reduced, while obtaining the same conversion per pass. In such an operation less organic vapor is required to obtain the desired results.

In another special aspect of our invention, flexible heat control at various points of the reaction and transfer system is afforded by heating the organic medium in a conventional tube type boiler, by separately superheating part of the vapors in a tube type or other conventional superheater and by injection of either vapor stream or an appropriate admixture of vapors from the boiler with superheated vapors from the superheater at the points of temperature control in the stripping sections and other portions of the system. The boiler temperature will depend somewhat on the physical properties of the organic medium selected and the operating boiler pressure as well as on the temperatures that are to be maintained. For example, with orthodichlorobenzene, (Dowtherm E), the boiler may be operated at about 260° C. and a pressure of about 75 p. s. i. g. instead of the atmospheric boiling point of 180° C. With trichlorobenzene instead of orthodichlorobenzene, boiler operation at 260° C. requires a boiler pressure of about 20 p. s. i. g. Superheater operation should be at about 450° to 550° C. for flexible control. Thus superheated vapors at about 500° C. may be furnished to the mixing zone in an amount sufficient to raise the incoming ammonium chloride slurry to reaction temperature, either directly or as the lifting medium for the recirculating melt. The temperature of the superheated vapor stream may be tempered by admixture of lower temperature vapors from the boiler. The temperature and proportions of the ammonium chloride containing melt and organic stripping vapors are adjusted so as to maintain a temperature of about 240° to 260° C. at the bottom of the hydrogen chloride stripping tower. Vapors from the boiler are furnished to the vapor lift pot or mixing chamber from which the effluent from the hydrogen chloride stripper is raised to the top of the ammonia stripping tower. Proportions and temperatures are selected in balance with the superheated stripping vapors directly introduced to the tower in order to obtain a temperature at the bottom of the ammonia stripping tower of about 340° to 360° C.

One of the important advantages afforded by our invention is the production of the ammonia and hydrogen chloride in anhydrous form. The vapor streams from the stripping stages are separately handled in similarly operated ammonia and hydrogen chloride recovery systems. The organic medium is condensed in each system and returned to the ammonium chloride feed preparation unit or, after removal of residual ammonium chloride or dissolved hydrogen chloride, to the boiler feed system. The gaseous product in each case may be cooled, dried and liquefied in a conventional compression and refrigeration system as desired.

By way of further example, a more detailed sequence of operating steps together with illustrative conditions will be illustrated by reference to the flow diagram of Figure 2 of the accompanying drawings.

A slurry of ammonium chloride in the organic liquid is prepared in tank 52. Solid ammonium chloride is added from a hopper (not shown) via line 92. Organic liquid is transferred from storage tank 84 via lines 85 and 91. The slurry is agitated by suitable means, for example, a mechanical stirrer (not shown).

Organic liquid is removed from tank 84 by means of pump 3 and vaporized in boiler 1. The vapors pass via line 91 to slurry tank 52. Any water in the ammonium chloride charged is vaporized through line 93, condensed in cooler 94 and passes to liquid separator 95. Supernatant water is discarded through line 96 and the organic liquid is returned via line 97 to slurry tank 52. When the organic liquid is lighter than water the outlets from separator 95 are reversed.

The hot slurry, e. g. at about 150° to 170° C., is transferred by pump 57 through line 87 to mix tank 130. Hot fused sodium bisulfate, e. g. at about 340° to 360° C., is introduced via line 37. Suitable temperature, e. g. about 200° to 260° C., is maintained by superheated vapors of the organic liquid. The superheater 83 is fed with saturated vapors from boiler 1 via line 98 and delivers superheated vapors via line 99 to mix tank 130. As soon as the ammonium chloride slurry and sodium bisulfate come in contact and are heated by the organic vapors, hydrogen chloride is disengaged into the gaseous phase and a mixture of hydrogen chloride and organic vapor passed into overhead line 70. The slurry is charged to the top of acid stripping tower 11 via line 101. Further quantities of organic vapor are introduced from the boiler into the bottom of the stripping tower via line 187.

A mixture of organic vapor and hydrogen chloride passes from the stripping tower into line 70 which connects with the hydrogen chloride recovery system. From the bottom of the acid stripping tower a melt comprising a mixture of salts but largely sodium ammonium sulfate is removed to a vapor mixing tank 282 where organic vapors are also introduced via line 181 from boiler 1. This heats and lifts the liquid through line 107 to the top of ammonia stripping tower 10, packed with any suitable packing. In the tank 282, a submergence of about ½-foot for each foot of lift is provided for line 107. Superheated organic vapor is introduced into the bottom of stripping tower 10 from the superheater 83 via line 283 and a mixture of ammonia and organic vapor passes into line 75 leading to the ammonia recovery system. From the bottom of the ammonia stripper 10, sodium bisulfate is removed to a vapor mixing tank 382 where organic vapors from superheater 83 are introduced. The melt is thus returned via line 37 to mixing tank 130.

The mixture of hydrogen chloride and organic vapor passes through line 70 to the recovery system and into the bottom of condensing tower 20 which is operated with a bottom temperature of about 170° C. for orthodichlorobenzene, for example. From the bottom of the tower, organic condensate is removed by pump 21 and recycled through steam boiler or water cooler 22 to the top of the tower through line 73. Excess of organic condensate over the necessary recycle to maintain a tower top temperature of about 150° C. is returned to a common solvent return line 186 leading to filter 86 to remove residual ammonium chloride suspended therein. Hydrogen chloride from the top of condensing tower 20 passes via line 71 to the base of secondary condensing tower 23. Additional quantities of organic vapor are condensed from the hydrogen chloride, the condensate being recycled by pump 24 from the bottom of tower 23 through water cooler 25 and line 74 to the top of tower 23. Hydrogen chloride from the top of the tower passes via line 72 to a sulfuric acid drier 80 where any traces of moisture are removed. The gas passes through chiller 42 cooled by refrigeration unit 46. Condensed organic liquid is removed in separator 43 and returned to filter 86 via line 186. Pure hydrogen chloride is removed via line 191. Alternatively an active carbon or silica gel adsorbant system may be substituted for the drying and refrigeration steps to remove any moisture and the last traces of organic vapor from the hydrogen chloride.

The ammonia recovery system is similar to the hydrogen chloride recovery system using primary condensing tower 30, recycle pump 31, cooler 32 and line 78 for temperature control in the primary condensing tower 30. The ammonia passes via line 76 to secondary condenser 33, cooled by recycling organic condensate by means of pump 34 through cooler 35 via line 79 to the top of secondary condensing tower 33. Ammonia passes via line 77 to chiller 40 and separator 44. Pure anhydrous ammonia gas is removed via line 192. All of the organic recycle pumps 21, 24, 31 and 34 discharge the recovered organic liquid into a common return line 186 leading to filter 86 to remove residual ammonium chloride. In order to avoid corrosion, the liquid charged to the filter and thence eventually into the boiler should be free from hydrogen chloride. For this purpose, it is appropriate to insert a continuous sampler and tester 186a into line 186 just before the filter 86. The sampler-tester controls the addition of anhydrous ammonia as necessary to insure an excess thereof in the organic liquid. The filter is periodically backwashed via line 193 to slurry tank 52. The filtered organic liquid is heated in stripping tower 89 by superheated organic vapors introduced via line 88 and the stripped liquid returned to the intake of pump 3 via line 90. Organic vapors and stripped ammonia are returned to line 76 in the ammonia recovery section via line 188.

The relative heights of the various towers are not significant but in general the hydrogen chloride stripping tower may be shorter than the ammonia stripping tower since considerable hydrogen chloride is stripped from the melt in the mix tank. In the ammonia stripping tower, moreover, the temperature of the melt must be sufficiently higher to effect evolution of ammonia and more severe stripping should be provided. For this reason a taller stripping tower is desirable for separating the ammonia than for the hydrogen chloride. The vapor quantities required are set by the ratio of ammonium chloride to melt and the stripping temperatures. The requirements of vapor are reduced by raising either the ammonium chloride concentration or the temperatures. In an illustrative 50-ton per day operation about 4748 tons of organic vapor from the boiler are required per day in an operation with a melt circulation rate of about 120 gallons per minute, a melt specific gravity of about 2.2 and ammonium chloride concentration of about 0.18 mole and hydrogen chloride and ammonia stripping temperatures of 260° and 360° C. respectively. Of the vapor requirements about 2575 tons per day are superheated to 500° C.

In the condensing sections of the recovery system, as shown in the figure, two separate condensing towers are shown but if desired these may be combined into a single condensing tower. The appropriate size of the tower depends on the throughput, the availability of cooling water or other refrigerant and the degree to which removal of the organic vapor from the product gas is desired.

In order to avoid decomposition of the sulfate salts it is preferred to operate the system in the absence of air. In starting, the system may be purged by means of vapors of the organic liquid until air-free. It has been reported that in reactions with bisulfate melts, sulfur dioxide is formed by decomposition. However, we have found that at temperatures as high as 360° C. no sulfur dioxide is formed in the absence of air.

The vapor lift sections of the system may be operated by other means, for example, by the introduction of nitrogen or other inert gases but this is accompanied by the disadvantage of having to separate the product gases from non-condensible materials, or having to recover the products in aqueous state. Ordinary air or oxygen-containing gases should not be used in the system because of their effect in increasing decomposition of the acid sulfate and in contributing materially to corrosion difficulties. Also instead of the vapor lift, ordinary pumps may be used or a blow case arrangement can be used to lift the melt. The vapor lift using the vapors of the organic liquid as lifting medium is, however, preferred as the simplest, most easily controlled and trouble-free means of effecting the desired result.

Glass is a suitable material of construction for lines carrying the bisulfate melt although other ceramics may be used. Nearly all metals except tantalum, gold and platinum are subject to excessive corrosion due to ammonium chloride and the melt. Recently high alloy stainless steels and nickel-molybdenum-chromium alloys have been described as resistant to the corrosive action of ammonium chloride. Ceramic packing, e. g. acid brick, is suitable for lining the stripping towers. Steel can be used for the ammonia recovery system and in the high temperature portions of the hydrogen chloride recovery system in the absence of water. Glass or graphite are recommended for other portions of the hydrogen chloride recovery system.

We claim:

1. A process for separating ammonia and hydrogen chloride from ammonium chloride which comprises mixing a slurry of ammonium chloride in an inert thermally stable organic liquid with a melt of a bisulfate in a mixing zone in an amount providing about 0.15 to 0.75 mole of ammonium chloride per mole of bisulfate, circulating the ammonium chloride containing melt from the mixing zone through successive hydrogen chloride and ammonia stripping zones, maintaining a stripping temperature of about 220° to 270° C. in the hydrogen chloride stripping zone, separately removing a vapor stream and the partially stripped melt from the hydrogen chloride stripping zone, maintaining a stripping temperature of 330° to 380° C. in the ammonia stripping zone, separately removing a vapor stream and the stripped melt from the ammonia stripping zone, controlling the stripping temperatures in the hydrogen chloride and ammonia stripping zone by direct injection of externally heated vapors of the organic liquid, returning the stripped melt to the mixing zone, recovering hydrogen chloride from the vapor stream removed from the hydrogen chloride stripping zone and recovering ammonia from the vapor stream removed from the ammonia stripping zone.

2. The process of claim 1 in which the circulating melt is elevated from low points in the system to higher points in the system by direct injection of a portion of the heated vapors of the organic liquid.

3. A process for separating ammonia and hydrogen chloride from ammonium chloride which comprises mixing a slurry of ammonium chloride in an inert thermally stable organic liquid with a melt of a bisulfate in a mixing zone in an amount providing about 0.15 to 0.75 mole of ammonium chloride per mole of bisulfate, circulating the ammonium chloride containing melt from the mixing zone through successive hydrogen chloride and ammonia stripping zones, maintaining a stripping temperature of about 220° to 270° C. in the hydrogen chloride stripping zone, separately removing a vapor stream and the partially stripped melt from the hydrogen chloride stripping zone, maintaining a stripping temperature of 330° to 380° C. in the ammonia stripping zone, separately removing a vapor tream and the stripped melt from the ammonia stripping zone, controlling the stripping temperatures in the hydrogen chloride and ammonia stripping zone by direct injection of externally heated vapors of the organic liquid, returning the stripped melt to the mixing zone, recovering hydrogen chloride from the vapor stream removed from the hydrogen chloride stripping zone, recovering ammonia from the vapor stream removed from the ammonia stripping zone, recovering organic liquid from each of said vapor streams, and returning the recovered organic liquid to the process system.

4. A process for separating ammonia and hydrogen chloride from ammonium chloride which comprises forming a slurry of ammonium chloride with a hot inert thermally stable organic liquid, adding the slurry to a melt of a bisulfate in a mixing zone in an amount providing about 0.15 to 0.75 mole of ammonium chloride per mole of bisulfate, contacting the mixture in a hydrogen chloride stripping zone with preheated vapors of the organic liquid in sufficient quantities and at sufficient temperature to obtain a stripping temperature of about 220° to 270° C. in the hydrogen chloride stripping zone, separately removing a vapor stream and the partially stripped melt from the hydrogen chloride stripping zone, contacting the partially stripped melt in an ammonia stripping zone with preheated vapors of the organic liquid in sufficient quantities and at sufficient temperature to obtain a stripping temperature of 330° to 380° C., in the ammonia stripping zone, separately removing a vapor stream and the stripped melt from the ammonia stripping zone, returning the stripped melt to the mixing zone, recovering hydrogen chloride from the vapor stream removed from the hydrogen chloride stripping zone and recovering ammonia from the vapor stream removed from the ammonia stripping zone.

5. The process of claim 4 in which the circulating melt is elevated from low points in the system to higher points in the system by direct injection of a portion of the heated vapors of the organic liquid.

6. A process for separating ammonia and hydrogen chloride from ammonium chloride which comprises forming a slurry of ammonium chloride with a hot inert thermally stable organic liquid, adding the slurry to a melt of a bisulfate in a mixing zone in an amount providing about 0.15 to 0.50 mole of ammonium chloride per mole of bisulfate, contacting the mixture in a hydrogen chloride stripping zone with preheated vapors of the organic liquid in sufficient quantities and at sufficient temperature to obtain a stripping temperature of about 240° to 260° C. in the hydrogen chloride stripping zone, separately removing a vapor stream and the partially stripped melt from the hydrogen chloride stripping zone, contacting the partially stripped melt in an ammonia stripping zone with preheated vapors of the organic liquid in sufficient quantities and at sufficient temperature to obtain a stripping temperature of 340° to 360° C. in the ammonia stripping zone, separately removing a vapor stream and the stripped melt from the ammonia stripping zone, returning the stripped melt to the mixing zone, recovering hydrogen chloride from the vapor stream removed from the hydrogen chloride stripping zone and recovering ammonia from the vapor stream removed from the ammonia stripping zone.

7. A process for separating ammonia and hydrogen chloride from ammonium chloride which comprises mixing a slurry of ammonium chloride in an inert thermally stable organic liquid with a melt of a bisulfate in a mixing zone in an amount providing about 0.15 to 0.75 mole of ammonium chloride per mole of bisulfate, circulating the ammonium chloride containing melt from the mixing zone through successive hydrogen chloride and ammonia stripping zones, maintaining a stripping temperature of about 240° to 260° C. in the hydrogen chloride stripping zone, separately removing a vapor stream and the partially stripped melt from the hydrogen chloride stripping zone, maintaining a stripping temperature of 340° to 360° C. in the ammonia stripping zone, separately removing a vapor stream and the stripped melt from the ammonia stripping zone, controlling the stripping temperatures in the hydrogen chloride and ammonia stripping zone by direct injection of externally heated vapors of the organic liquid, returning the stripped melt to the mixing zone, recovering hydrogen chloride from the vapor stream removed from the hydrogen chloride stripping zone and recovering ammonia from the vapor stream removed from the ammonia stripping zone.

References Cited in the file of this patent

UNITED STATES PATENTS

| | | |
|---|---|---|
| 379,487 | Mond | Mar. 13, 1888 |
| 1,718,420 | Kessler | June 25, 1929 |
| 1,892,652 | Heath | Dec. 27, 1932 |
| 2,326,099 | Kokatnur et al. | Aug. 3, 1943 |

OTHER REFERENCES

Hackh's Chem. Dictionary, 1944, third ed. revised, page 287, The Blakiston Co., Philadelphia.

J. W. Mellor's Inorganic and Theoretical Chem., vol. 2, pages 566–567, Longmans, Green and Co., N. Y.